(12) United States Patent
Chou

(10) Patent No.: US 9,898,110 B1
(45) Date of Patent: Feb. 20, 2018

(54) MOUSE PAD, INPUT SYSTEM AND PAIRING METHOD THEREOF

(71) Applicants: DEXIN ELECTRONIC LTD., Donggaun Guangdong (CN); DEXIN CORPORATION, New Taipei (TW)

(72) Inventor: Hung-Jen Chou, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/347,760

(22) Filed: Nov. 9, 2016

(51) Int. Cl.
*G06F 3/039* (2013.01)
*G06F 3/0354* (2013.01)

(52) U.S. Cl.
CPC ........ *G06F 3/0395* (2013.01); *G06F 3/03543* (2013.01)

(58) Field of Classification Search
CPC .......................... G06F 3/03543; G06F 3/0395
USPC ................................................. 345/163–166
See application file for complete search history.

(56) References Cited

U.S. PATENT DOCUMENTS

| 2007/0002022 A1* | 1/2007 | Joung | G06F 3/0317 345/166 |
|---|---|---|---|
| 2008/0259046 A1 | 10/2008 | Carsanaro | |
| 2010/0289744 A1* | 11/2010 | Cohen | H04L 49/153 345/163 |
| 2010/0315350 A1* | 12/2010 | Rene | G06F 3/0395 345/173 |
| 2011/0175567 A1* | 7/2011 | Kidakarn | G06F 1/266 320/108 |

FOREIGN PATENT DOCUMENTS

| CN | 105260041 A | 1/2016 |
|---|---|---|
| CN | 205281435 U | 6/2016 |
| TW | M396998 U1 | 1/2011 |

\* cited by examiner

*Primary Examiner* — Michael Pervan
(74) *Attorney, Agent, or Firm* — Li & Cai Intellectual Property (USA) Office

(57) ABSTRACT

An embodiment of the present disclosure provides a mouse pad. The mouse pad includes a substrate and storage module. The substrate includes a first surface. A mouse device can move on the first surface. The storage module is located in the substrate for surface parameters of the first surface of the mouse pad, operation parameters or calibration parameters of the mouse device. When the mouse device moves on the first surface, the mouse device executes an optimization process to generate the calibration parameters according to the surface parameters, and the mouse device transmits the calibration parameters to the mouse pad.

11 Claims, 4 Drawing Sheets

MOUSE PAD, INPUT SYSTEM AND PAIRING METHOD THEREOF

BACKGROUND

1. Technical Field

The present disclosure relates to a mouse pad, more particularly to a mouse pad including a storage module.

2. Description of Related Art

A mouse device is a general input device of a computer system. Recently, speed, resolution and precision of the laser mouse or the optical mouse are better than the mechanical mouse. Even if the speed, resolution and precision are improved, an optimization process of the computer mouse wastes a lot of time to detect the surface parameters of the mouse pad when the mouse device has not been used on the mouse pad for a long time.

Therefore, how to develop a mouse pad providing calibration parameters of the optimization process or the surface parameters of the mouse pad is the topic of the present disclosure.

SUMMARY

An embodiment of the present disclosure provides a mouse pad. The mouse pad includes a substrate and storage module. The substrate includes a first surface. A mouse device can move on the first surface. The storage module is located in the substrate for surface parameters of the first surface of the mouse pad, operation parameters or calibration parameter of the mouse device. When the mouse device moves on the first surface, the mouse device executes an optimization process to generate the calibration parameters according to the surface parameters, and the mouse device transmits the calibration parameters to the mouse pad.

An embodiment of the present disclosure provides an input system. The input system includes a mouse pad and a mouse device. The mouse pad includes a substrate, a communication module, and a storage module. The substrate includes a first surface. The communication is located in the substrate. The storage module is located in the substrate for storing surface parameters of the first surface of the mouse pad. The mouse device includes a detecting unit, a processing unit and a communication unit. The detecting unit is used for detecting the surface parameters and operation parameters of the mouse device. The processing unit is used for executing an optimization process to generate calibration parameters according to the surface parameters of the first surface. The communication unit is used for transmitting the calibration parameters to the mouse pad.

An embodiment of the present disclosure provides a pairing method adapted for a mouse device and a mouse pad. The mouse device moves on a first surface of the mouse pad. The pairing method includes: detecting surface parameters of the first surface for executing an optimization process to generate calibration parameters when calibration parameters corresponding to an identification number of the mouse device are not stored in a storage module of the mouse pad; and transmitting the calibration parameters and the identification number of the mouse device to the mouse pad. The calibration parameters and the identification number of the mouse device are stored in the storage module of the mouse pad.

The mouse pad of the present disclosure receives the calibration parameters of the mouse device paired with the mouse pad through the communication module and stores the calibration parameters in the storage module. When the mouse device is reused on the surface of the mouse pad, the mouse pad asks the mouse device to provide the identification number and determine whether calibration parameters corresponding to the identification number of the mouse device are stored in the storage module of the mouse pad. When the calibration parameters corresponding to the identification number of the mouse device are stored in the storage module of the mouse pad, the calibration parameters can be transmitted to the mouse device through the communication module. Therefore, the optimization process of the mouse device can be sped up. The mouse pad further stores the surface parameters of the first surface detected at different time points and an optimization parameter interval for monitoring the mouse device or the mouse pad. Therefore, the sensitivity of the mouse device moving on the mouse pad can be detected.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
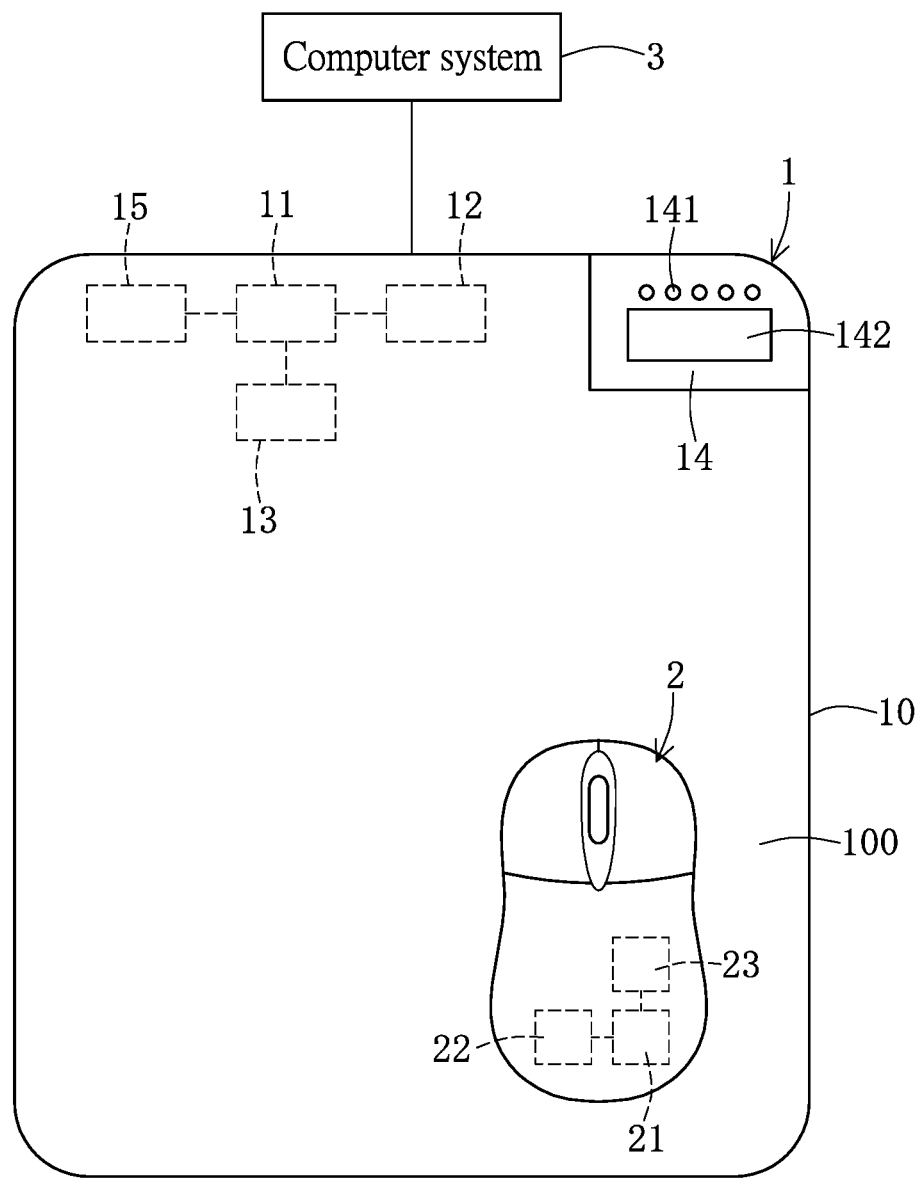
FIG. 1 is a schematic diagram of a mouse pad, a mouse device and a computer system according to an embodiment of the present invention.

Reference will now be made in detail to the exemplary embodiments of the present disclosure, examples of which are illustrated in the accompanying drawings. However, they may be embodied in different forms and should not be construed as limited to the embodiments set forth herein. These embodiments are provided so that this disclosure will be thorough and complete, and will fully convey the inventive concept to those skilled in the art. In the drawings, the thickness and relative thickness of layers and regions may be exaggerated for clarity. Similar constituent elements are generally designated with the same reference numerals throughout the specification.

It will be understood that, although the terms 'first', 'second', 'third', etc., may be used herein to describe various elements or signal, etc., these elements or signals should not be limited by these terms. The terms are used only for the purpose of distinguishing one component from another component, or one signal from another signal. In addition, as used herein, the term "or" includes any and all combinations of one or more of the associated listed items.

Figure 2:
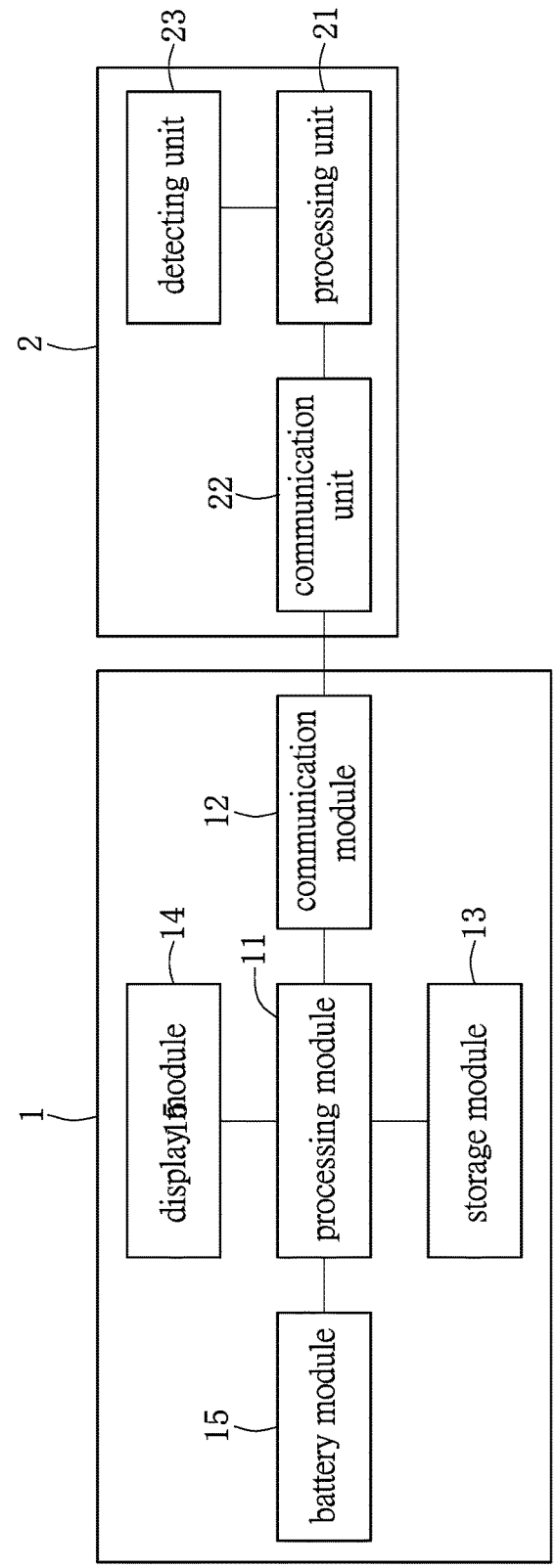
FIG. 2 is a schematic diagram of the mouse pad and the mouse device according to the embodiment of the present invention.
Figure 3:
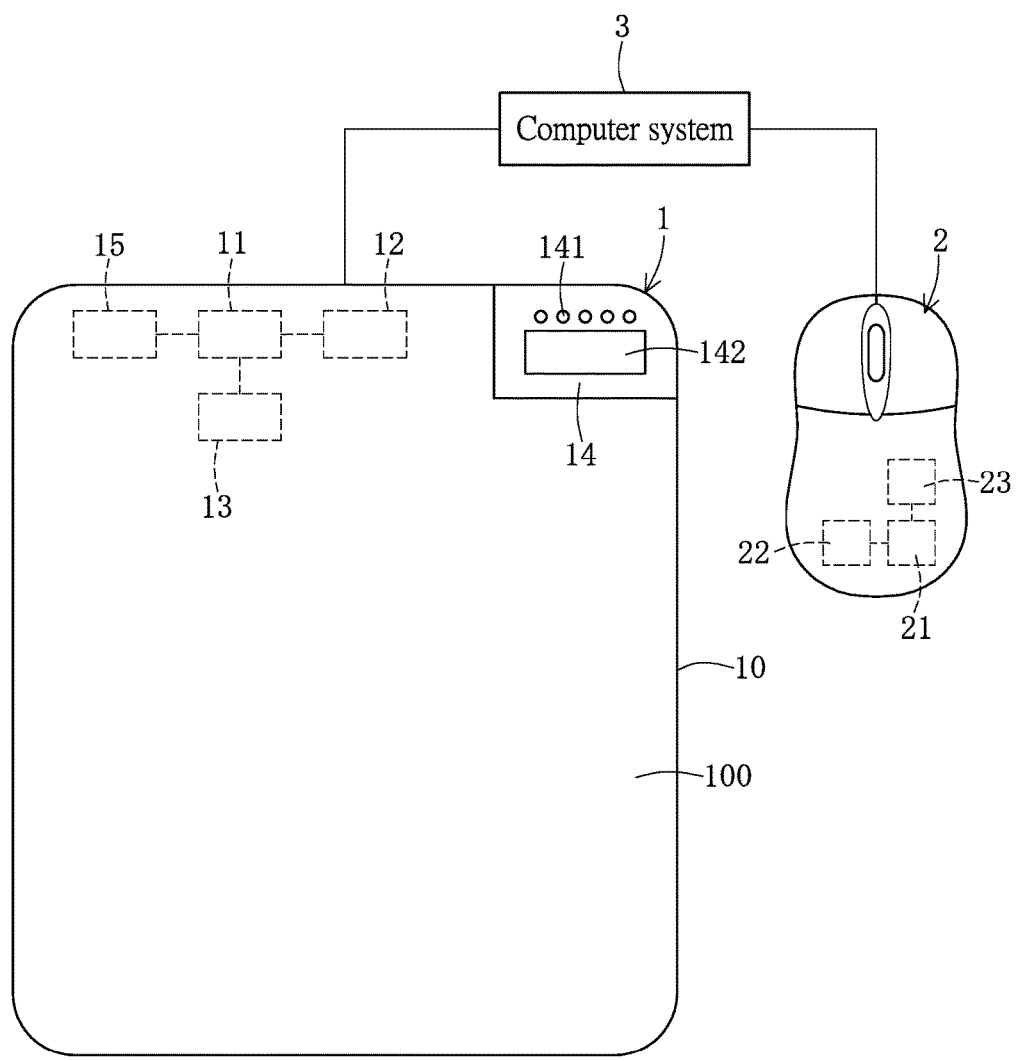
FIG. 3 is a schematic diagram describing how the mouse pad communicates with the mouse device through a computer system.

Referring to FIGS. 1-3, FIG. 1 is a schematic diagram of a mouse pad, a mouse device and a computer system according to an embodiment of the present invention. FIG.

2 is a schematic diagram of the mouse pad and the mouse device according to the embodiment of the present invention. FIG. 3 is a schematic diagram describing how the mouse pad communicates with the mouse device through a computer system.

A mouse pad 1 includes a substrate 10, a processing module 11, a communication module 12, a storage module 13, a display module 14 and a battery module 15. The processing module 11 is electrically connected to the communication module 12, the storage module 13, the display module 14 and the battery module 15. The processing module 11, the communication module 12, the storage module 13 and a battery module 15 are located in the substrate 10. The display module is mounted on the substrate 10.

The substrate 10 includes a first surface 100. The mouse device 2 moves on the first surface 100.

The mouse device 2 includes a processing unit 21, a communication unit 22 and a detecting unit 23. The processing unit 21 is electrically connected to the communication unit 22 and the detecting unit 23. The detecting unit 23 is used for detecting surface parameters of the first surface 100 and operation parameters of the mouse device 2. The processing unit 21 executes an optimization process of the mouse device 2 to generate calibration parameters according to the surface parameters of the mouse pad 1 and the operation parameters of the mouse device 2. The communication unit 22 transmits the calibration parameters of the mouse device 2 to the mouse pad 1. The communication module 12 receives the calibration parameters from the mouse device 2. The calibration parameters are stored in the storage module 13 of the mouse pad 1 by the processing module 11. In addition, initial surface parameters of the first surface 100 are also stored in the storage module 13. The initial surface parameters of the first surface can be obtained when the mouse pad 1 is tested in the manufacturing processes. The mouse device 2 can use the initial surface parameters stored in the mouse pad 1 or detect the newest surface parameters of the first surface 100. In addition, the storage module 13 of the mouse pad 1 further stores the operation parameters of the mouse device 2, such as maximum speed, maximum acceleration, dots per inch (DPI) and response time.

The material of the mouse pad 1 includes fabric, plastics, recycled rubber tires, neoprene, silicone rubber, leather, glass, cork and wood. The mouse pad 1 can pre-store surface parameters of the first surface 100 and manufacturing test data in the storage module 13. In another embodiment, the mouse device 2 can record the surface parameters of the first surface 100 at every predetermined time interval.

Moreover, the test data of the mouse pad 1 cooperating with optical sensor module or laser sensor module is stored in the storage module 13 for enhancing the optimization process of the mouse device 2. In another embodiment, the mouse pad 1 or the mouse device 2 can further store an optimization parameter interval. When the calibration parameters of the mouse device 2 is not between the optimization parameter interval, the mouse pad 1 or the mouse device 2 can transmit a signal to notice the user to adjust or change the mouse device 2 or mouse pad 1.

In the embodiment, when the communication module 12 of the mouse pad 1 detects the communication unit 22 and the mouse pad 1 is paired with the mouse device 2, the mouse pad 1 transmits the calibration parameters to the mouse device 2 for executing the optimization process. Moreover, the mouse pad 1 stores the identification number of the mouse device 2 and the calibration parameters in the storage module. Even if the mouse device 2 has not been used on the mouse pad 1 for a long time, the mouse device 2 can easily obtain the calibration parameters and the surface parameters of the first surface 100 stored in the storage module 13 of the mouse pad 1 to execute the optimization process when the mouse device 2 is reused on the mouse pad 1. Therefore, the optimization process of the mouse device 2 is capable of being sped up. Moreover, the mouse pad 1 can store a plurality of identification numbers of different mouse devices and calibration parameters corresponding to the identification numbers. The user can arbitrarily choose a different mouse device to use on the mouse pad 1.

Referring to FIG. 3, the mouse device 2 transmits the calibration parameters to a computer system 3, and then the computer system 3 transmits the calibration parameter to the mouse pad 1. The calibration parameters are stored in the storage module 13 of the mouse pad 1. In the other embodiment (as shown in FIG. 2), the mouse device 2 can wirelessly transmit the calibration parameters to the communication module 12 of the mouse pad 1 through the communication unit 22.

The communication module 12 and the communication unit 22 include a wired communication module or a wireless communication module. In addition, the communication module 12 and the communication unit 22 include a Wi-Fi communication module, Bluetooth communication module, Bluetooth low energy communication module or Zigbee communication module. In the other embodiment, the communication module 12 of the mouse pad 1 can be used as a repeater or an access point (AP).

The display module 14 of the mouse pad 1 includes a light emitting unit 141 and a display unit 142. The light emitting unit 141 includes a plurality of light emitting diodes for displaying the battery life of the battery module 15 of the mouse pad 1 or a battery unit (not shown) of the mouse device 2. In another embodiment, the light emitting unit 141 can be used to show the network connection status between the mouse pad 1 and the mouse device 2. The battery module 15 is used for providing an electric power to the mouse pad 1.

In the embodiment, the display unit 142 of the display module 14 is an LED display module, an OLED display module or an LCD display module. The display unit 142 is used for showing the surface friction coefficient and the roughness of the mouse pad 1, click number of buttons of mouse device 2, the maximum speed and the maximum acceleration of the mouse pad 1, or a notice signal.

Figure 4:
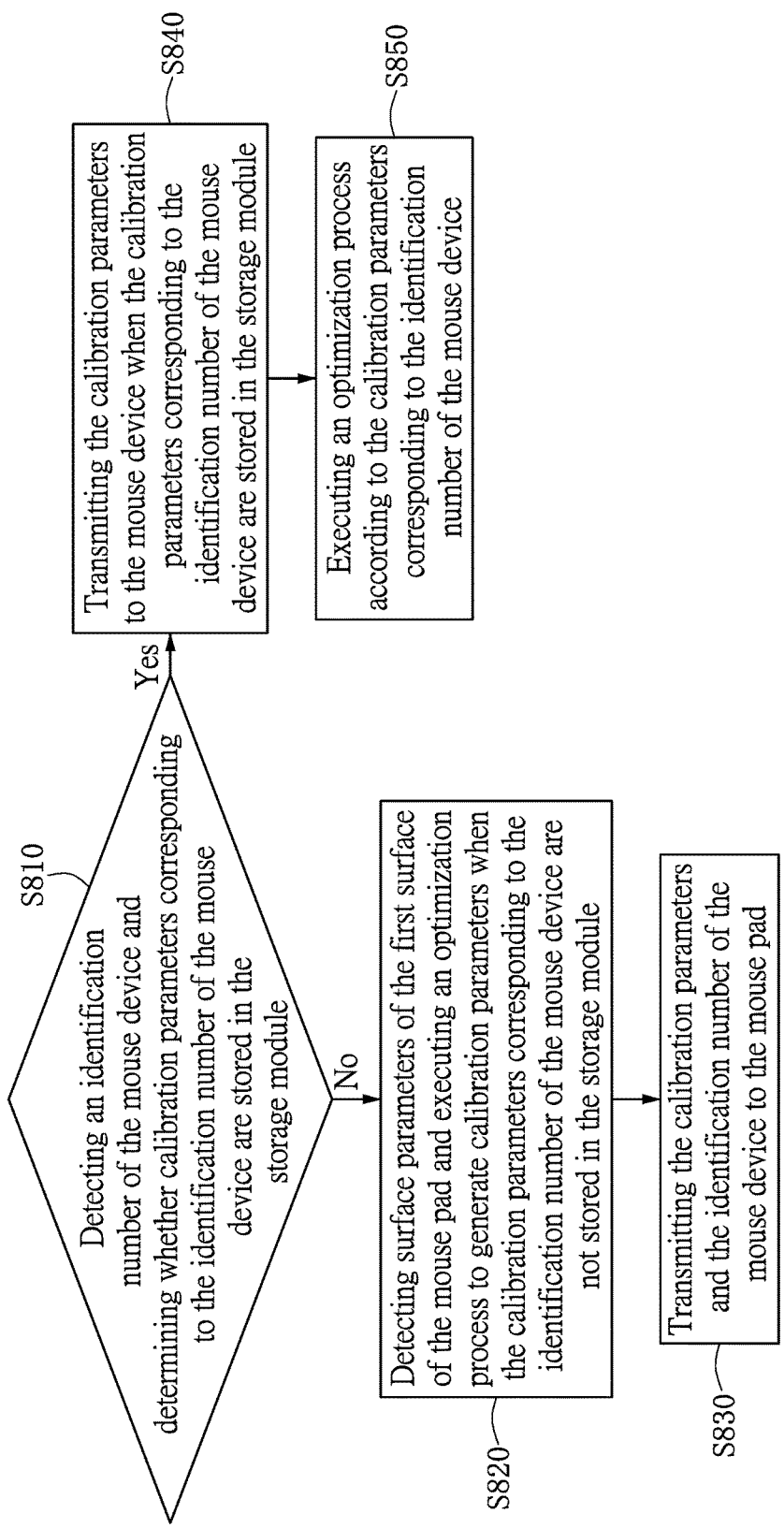
FIG. 4 is a flow chart of a pairing method according to an embodiment of the present invention.

Referring to FIG. 4, FIG. 4 is a flow chart of a pairing method according to an embodiment of the present invention.

In the embodiment, the pairing method is adapted for the mouse pad 1 and the mouse device 2.

The pairing method adapted for the mouse pad 1 and the mouse device 2 includes the following steps.

Step S810: Detecting an identification number of the mouse device 2 and determining whether calibration parameters corresponding to the identification number of the mouse device 2 are stored in the storage module 13.

Step S820: Detecting surface parameters of the first surface 100 of the mouse pad 1 and executing an optimization process to generate calibration parameters when the calibration parameters corresponding to the identification number of the mouse device 2 are not stored in the storage module 13.

Step S830: Transmitting the calibration parameters and the identification number of the mouse device 2 to the mouse pad 1. The calibration parameters and the identification number of the mouse device 2 are stored in the storage module 13 of the mouse pad 1.

The pairing method further includes the following steps.

Step S840: Transmitting the calibration parameters to the mouse device 2 when the calibration parameters corresponding to the identification number of the mouse device 2 are stored in the storage module 13. The mouse pad 1 transmits the calibration parameters corresponding to the identification number of the mouse device 2 to the mouse device 2 by a communication module 12.

Step S850: Executing an optimization process according to the calibration parameters corresponding to the identification number of the mouse device 2.

In Step S810, the communication module 12 of the mouse pad 1 is used for detecting whether the mouse device 2 is moving on the first surface 100. When the communication module 12 detects the signals transmitted from the communication unit 22 of the mouse device 2, the communication module 12 transmits a connection request to the communication unit 22 and asks the mouse device 2 to provide the identification number. In Step S820, the surface parameters of the first surface 100 include surface friction coefficient, roughness or test data of a different sensor module. In Step S830, the mouse device 2 wirelessly transmits the calibration parameters and the identification number to the mouse pad 1. The mouse device 2 also can transmit the calibration parameters and the identification number to the mouse pad 1 through the computer system 3.

In Step S840, the mouse pad 1 can wirelessly transmit the calibration parameters to the mouse device 2. The mouse pad 1 also can transmit the calibration parameters and the identification number to the mouse device 2 through the computer system 3.

The mouse pad of the present disclosure receives the calibration parameters of the mouse device paired with the mouse pad through the communication module and stores the calibration parameters in the storage module. When the mouse device is reused on the surface of the mouse pad, the mouse pad asks the mouse device to provide the identification number and determine whether calibration parameters corresponding to the identification number of the mouse device are stored in the storage module of the mouse pad. When the calibration parameters corresponding to the identification number of the mouse device are stored in the storage module of the mouse pad, the calibration parameters can be transmitted to the mouse device through the communication module. Therefore, the optimization process of the mouse device can be sped up. The mouse pad further stores the surface parameters of the first surface detected at different time points and an optimization parameter interval for monitoring the mouse device or the mouse pad. Therefore, the sensitivity of the mouse device moving on the mouse pad can be detected.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A mouse pad comprising:
   a substrate, comprising a first surface, wherein a mouse device moves on the first surface; and
   a storage module, defined in the substrate for storing surface parameters of the first surface of the mouse pad, operation parameters or calibration parameters of the mouse device;
   wherein when the mouse device moves on the first surface, the mouse device executes an optimization process to generate the calibration parameters according to the surface parameters, and the mouse device transmits the calibration parameters to the mouse pad.

2. The mouse pad of claim 1, wherein when the mouse device moves on the first surface of the mouse pad, the mouse pad receives an identification number of the mouse device, and calibration parameters corresponding to the identification number of the mouse device being stored in the storage module of the mouse pad, the mouse pad transmits the calibration parameters corresponding to the identification of the mouse device to the mouse device.

3. The mouse pad of claim 1, further comprising:
   a communication module, for communicating with the mouse device or a computer system.

4. The mouse pad of claim 1, wherein the mouse device comprises:
   a detecting unit, for detecting the surface parameters of the mouse pad and the operation parameters of the mouse device;
   a processing unit, for executing an optimization process to generate calibration parameters according to the surface parameters of the first surface; and
   a communication unit, for transmitting the calibration parameters to the mouse pad.

5. The mouse pad of claim 3, wherein the communication unit of the mouse device transmits the calibration parameters to the computer system, and the computer system transmits the calibration parameters to the communication module of the mouse pad.

6. The mouse pad of claim 3, wherein the communication unit of the mouse device transmits the calibration parameters to the communication module of the mouse module, and the communication unit and the communication module are wireless communication modules.

7. The mouse pad of claim 1, further comprising:
   a battery module, for providing an electric power to the mouse pad;
   a display module;
   a processing module electrically connected to the battery module and the display module, wherein the display module is used for displaying a battery life of the battery module, a surface friction coefficient and a surface roughness of the mouse pad.

8. The mouse pad of claim 7, further comprising:
   a communication module, for communicating with the mouse device or a computer system and receiving the calibration parameters from the mouse device or the computer system.

9. An input system, comprising:
   a mouse pad, comprising:
   a substrate, comprising a first surface;
   a communication module, defined in the substrate; and
   a storage module, defined in the substrate for storing surface parameters of the first surface of the mouse pad; and
   a mouse device, comprising:
      a detecting unit for detecting the surface parameters and operation parameters of the mouse device;
      a processing unit, executing an optimization process to generate calibration parameters according to the surface parameters of the first surface; and a communication unit, for transmitting the calibration parameters to the mouse pad.

10. A pairing method adapted for a mouse device and a mouse pad, wherein the mouse device moves on a first surface of the mouse pad, the pairing method comprising:
- detecting surface parameters of the first surface for executing an optimization process to generate calibration parameters when calibration parameters corresponding to an identification number of the mouse device are not stored in a storage module of the mouse pad; and
- transmitting the calibration parameters and the identification number of the mouse device to the mouse pad;
- wherein the calibration parameters and the identification number of the mouse device are stored in the storage module of the mouse pad.

11. The pairing method of claim 10, further comprising:
- transmitting the calibration parameters corresponding to the identification number of the mouse device by a communication module to the mouse device when the calibration parameters corresponding to the identification number of the mouse device are stored in the storage module of the mouse pad; and
- executing the optimization process according to the calibration parameters corresponding to the identification number of the mouse device.

* * * * *